(12) United States Patent
Reuven

(10) Patent No.: US 6,285,718 B1
(45) Date of Patent: Sep. 4, 2001

(54) ADAPTIVE NOISE CANCELLER

(75) Inventor: Ilan Reuven, Ramat Gan (IL)

(73) Assignee: Orckit Communication Ltd., Tel Aviv (IL)

( * ) Notice: Subject to any disclaimer, the term of this patent is extended or adjusted under 35 U.S.C. 154(b) by 0 days.

(21) Appl. No.: 09/500,681

(22) Filed: Feb. 9, 2000

Related U.S. Application Data

(63) Continuation of application No. 08/807,336, filed on Feb. 28, 1997, now Pat. No. 6,047,022.

(51) Int. Cl.[7] .............................. H04B 3/00; H04M 1/00
(52) U.S. Cl. ........................................... 375/257; 379/410
(58) Field of Search ..................................... 375/257, 222, 375/261, 219, 316, 358, 340; 379/410, 411, 416

(56) References Cited

U.S. PATENT DOCUMENTS

| | | | |
|---|---|---|---|
| 3,567,873 | 3/1971 | Peronia .............................. | 179/170.2 |
| 4,649,505 | 3/1987 | Zinser, Jr. et al. .................... | 379/411 |
| 4,924,492 | 5/1990 | Gitlin et al. . | |
| 5,195,140 | 3/1993 | Kudo et al. ............................. | 381/71 |
| 5,293,402 | * 3/1994 | Crespo et al. ........................ | 375/233 |
| 5,465,413 | 11/1995 | Enge et al. ............................ | 455/307 |
| 5,727,073 | 3/1998 | Ikeda ................... | 381/94.7 |
| 6,047,022 | * 4/2000 | Reuven ................... | 375/222 |

FOREIGN PATENT DOCUMENTS

| | | | |
|---|---|---|---|
| 0273793 | 7/1988 | (EP) ................................. | H03H/7/01 |
| 0453213 | 10/1991 | (EP) ............................... | H04B/15/00 |
| 0606916 | 7/1994 | (EP) .................................. | H04L/5/06 |

OTHER PUBLICATIONS

Ng. T.S., Some Aspects of an Adaptive Digital Notch Filter with Contrained Poles and Zeros, IEEE Trans. on Acoustics, Speech & Signal Processing, ASSP–35(2), Feb. 1987, pp. 158–161.

Chen, W.Y., et al., High Bit Rate Digital Subscriber Line Echo Cancellation, IEEE Journal on Selected Areas in Communications, vol. 9(6), Aug. 1991, pp. 848–860.

Qureshi, S.U., Adaptive Equalization, Proceedings of the IEEE, vol. 73(9), Sep. 1985, pp. 1349–1387.

Gitlin, R.D., et al., Digital Communication Principles, Plenum Press, New York, 1992, Chapters: 6 (pp. 403–464 and 8 (pp. 517–605).

Lee, E.A. et al., Digital Communication, Kluwer Academic Publishers, Boston 1988, Chapters: 4 (pp. 77–93 and 9 (pp. 371–3402).

Stoica, P., et al., Performance Analysis of an Adaptive Notch Filter with Constrained Poles and Zeros, IEEE Trans on Acoustics, Speech and Signal Processing, vol. 36(6), Jun. 1988, pp. 911–918.

(List continued on next page.)

*Primary Examiner*—Chi Pham
*Assistant Examiner*—Khai Tran
(74) *Attorney, Agent, or Firm*—Darby & Darby

(57) ABSTRACT

This invention discloses an apparatus for transmission of high speed data over communication channels, the apparatus including a modulator operative to modulate an outgoing stream of digital data, thereby to generate an outgoing signal, and a demodulator operative to demodulate an incoming signal, thereby to generate an incoming stream of digital data, wherein the modulator comprises a band suppressor for suppressing portions of the outgoing signal which have specified frequencies.

23 Claims, 10 Drawing Sheets

OTHER PUBLICATIONS

Regalia, P.A., Adaptive IIR Filtering in Signal Processing and Control, Marcel Dekker and Publishers, New York, 1995, Chapter: 10 (pp. 554–599).

Analog Devices, 10–Bit, 400 MSPS D/A Converters: AD9720/AD9721, Digital–to–Analog Converters, pp. 3–272 thru 3–278.

Analog Devices, 10–Bit MSP A/D Converters: AD9040A, Analog–to–Digital Converters, pp. 2–444 thru 2–454.

Young, G. et al., "Broadband Multimedia Delivery Over Copper", BT Technol, Journal, BT Laboratories vol. 13, No. 4, Oct. 1995, pp. 78–96.

Kim, D.W. et al., "An Adaptive Decision Feedback Equalizer Using Error Feedback", IEEE Transactions on Consumer Electronics, IEEE Inc. NY, vol. 42, No. 3, Aug. 1996, pp. 468–476.

* cited by examiner

ADAPTIVE NOISE CANCELLER

CROSS-REFERENCE TO RELATED APPLICATION

This application is a continuation of U.S. patent application Ser. No. 08/807,336, filed Feb. 28, 1997, now U.S. Pat. No. 6,047,022, which is assigned to the assignee of the present patent application and whose disclosure is incorporated herein by reference.

FIELD OF THE INVENTION

The present invention relates to apparatus and methods for wideband transmission of digital signals over telephone wires.

BACKGROUND OF THE INVENTION

A CAP (carrierless amplitude and phase) modulator is described in U.S. Pat. No. 4,924,492 to Gitlin et al.

Use of adaptive notch filters having constrained poles and zeros to eliminate narrow-band or sine wave components with unknown frequencies from observed time series is described in Stoica, P. and Nehorai, A., "Performance analysis of an adaptive notch filter with constrained poles and zeros", IEEE Transactions on Acoustics, Speech and Signal Processing, 36(6), June 1988, and in Ng, T. S., "Some aspects of an adaptive digital notch filter with constrained poles and zeros", IEEE Transactions on Acoustics, Speech and Signal Processing, ASSP-35(2), February 1987.

The disclosures of all publications mentioned in the specification and of the publications cited therein are hereby incorporated by reference.

SUMMARY OF THE INVENTION

The present invention seeks to provide improved modem apparatus.

The present invention relates to the transmission, at high bit rate, of digital signals over copper telephone wires. The pervading demand for high speed digital traffic requires the use of a high capacity physical medium as the backbone of a network. This is usually implemented via broadband optical fiber or coaxial cable. These cables interconnect the geographically distant central offices of the service providers (e.g. telephone companies) and also interconnect the central communications areas and curbside optical network units.

However, it is still extremely expensive to deploy fiber optic or coaxial cable to the individual premises of the customers. Therefore, the transmission over the local loop, typically the last 1–2 miles from an adjacent central office or from a curbside optical network unit to the customers' premises utilizes the existing infrastructure of twisted copper wires.

The local telephone line connecting a central office to the customers' premises is conventionally used for analog transmission of voice signals. DSL (digital subscriber line) technologies are used by telephone companies to provide high speed digital transmission over the local loop at reasonable cost. The use of copper local loops in conjunction with the backbone optical network enables broadband services to be provided to customers. There are various DSL technologies which vary in their transmission symmetries and transmission rates. The rate of transmission limits the service reach.

VDSL (very high bit rate digital subscriber line) is a type of DSL technology now being developed to carry high speed data for applications such as ATM (asynchronous transfer mode) and digital compressed video. VDSL technology increases the downstream data rate to about 13 to 52 Mb/s and the upstream data rate to about 1.6 to 6.5 Mb/s. These high rates require the use of frequency bands which are not used by other DSL technologies. A difficulty to be overcome is that the transmitted spectrum of a VDSL signal overlaps AM broadcasts and amateur radio transmissions causing RF (radio frequency) egress and RF ingress. RF egress is the radiation from the VDSL transmission into amateur radio receivers. Field measurements have shown that the transmitted PSD (power spectral density) at amateur radio bands should be maintained at a low level to minimize interference, however the low level of PSD cannot be allowed to significantly compromise performance.

RF ingress is the induced power of the amateur radio transmission onto the VDSL receiver. The received interference may be stronger than the VDSL signal and state of the art digital receiving schemes may not be adequate to handle such a high level of noise. The frequency of amateur radio transmissions tends to drift, necessitating careful monitoring by the VDSL receiver.

There is thus provided, in accordance with a preferred embodiment of the present invention, apparatus for transmission of high speed data over communication channels, the apparatus including a modulator operative to modulate an outgoing stream of digital data, thereby to generate an outgoing signal, and a demodulator operative to demodulate an incoming signal, thereby to generate an incoming stream of digital data, wherein the modulator includes a band suppressor for suppressing portions of the outgoing signal which have specified frequencies.

Further in accordance with a preferred embodiment of the present invention, the specified frequencies include fixed predetermined frequencies and/or programmable frequencies.

Still further in accordance with a preferred embodiment of the present invention, the specified frequencies include a plurality of frequency bands.

Additionally in accordance with a preferred embodiment of the present invention, the band suppressor includes a plurality of band suppressor elements operative to suppress portions in the outgoing signal whose frequencies fall within the plurality of frequency bands respectively.

Still further in accordance with a preferred embodiment of the present invention, the modulator includes a single carrier modulator such as a quadrature amplitude modulator (QAM).

Also provided, in accordance with another preferred embodiment of the present invention, is apparatus for transmission of high speed data over communication channels, the apparatus including a modulator operative to modulate an outgoing stream of digital data, thereby to generate an outgoing signal, and a demodulator operative to demodulate an incoming signal, thereby to generate an incoming stream of digital data, wherein the demodulator includes a noise canceller including an adaptive IIR (infinite impulse response) digital filter operative to cancel narrow band interfering signals.

Further in accordance with a preferred embodiment of the present invention, the band suppressor includes at least one infinite impulse response (IIR) digital filter.

Still further in accordance with a preferred embodiment of the present invention, the demodulator also includes a noise canceller including a first adaptive digital filter receiving a first input signal and a second adaptive digital filter receiving a second input signal wherein the second input signal is received as an error signal by the first adaptive digital filter, wherein adaptation of the first adaptive digital filter is performed in accordance with the error signal and wherein an output of the noise canceller includes a combination of the outputs of the first and second adaptive digital filters.

Further in accordance with a preferred embodiment of the present invention, the demodulator includes a decision feedback equalizer and wherein the band suppressor is characterized in that any distortion of the incoming signal caused by the band suppressor is compensated substantially totally by the decision feedback equalizer.

Also provided, in accordance with another preferred embodiment of the present invention, is apparatus for transmission of high speed data over communication channels, the apparatus including a communication channel, a modulator operative to modulate an outgoing stream of digital data, thereby to supply an outgoing signal to the communication channel, and a demodulator operative to receive an incoming signal from the communication channel and to demodulate the incoming signal, thereby to generate an incoming stream of digital data, wherein the demodulator includes a band suppressor for suppressing portions of the incoming signal which have specified frequencies.

Further in accordance with a preferred embodiment of the present invention, the communication channel includes a two-wire telephone local loop.

Still further in accordance with a preferred embodiment of the present invention, the band suppressor includes an infinite impulse response digital filter.

Additionally in accordance with a preferred embodiment of the present invention, the infinite impulse response digital filter has an infinite impulse response which decays rapidly to a level close to zero.

Still further in accordance with a preferred embodiment of the present invention, the demodulator includes a decision feedback equalizer having a time span and wherein the infinite response digital filter has an infinite impulse response characterized in that the total energy of the infinite impulse response, summed over time, after the time span is small relative to the total energy of the infinite impulse response during the time span.

Further in accordance with a preferred embodiment of the present invention, the total energy of the infinite impulse response, summed over time, after the time span is less than $1/10$, or even less than $1/100$, or even less than $1/1000$ of the total energy of the infinite impulse response during the time span.

Also provided, in accordance with another preferred embodiment of the present invention, is apparatus for transmission of high speed data over communication channels, the apparatus including a modulator operative to modulate an outgoing stream of digital data, thereby to generate an outgoing signal, and a demodulator operative to demodulate an incoming signal, thereby to generate an incoming stream of digital data, wherein the demodulator includes a noise canceller generating an output, the demodulator including a first adaptive digital filter receiving a first input signal and a second adaptive digital filter receiving a second input signal wherein the second input signal is received as an error signal by the first adaptive digital filter, wherein adaptation of the first adaptive digital filter is performed in accordance with the error signal and wherein the output of the noise canceller includes a combination of the outputs of the first and second adaptive digital filters.

Further in accordance with a preferred embodiment of the present invention, the first adaptive digital filter includes an adaptive infinite impulse response filter.

Still further in accordance with a preferred embodiment of the present invention, the demodulator includes a band suppressor for suppressing portions of the incoming signal which have specified frequencies.

Further in accordance with a preferred embodiment of the present invention, the demodulator also includes a noise canceller including a first adaptive digital filter receiving a first input signal and a second adaptive digital filter receiving a second input signal wherein the second input signal is received as an error signal by the first adaptive digital filter, wherein adaptation of the first adaptive digital filter is performed in accordance with the error signal and wherein the output of the noise canceller includes a combination of the outputs of the first and second adaptive digital filters.

Still further in accordance with any of the above preferred embodiments of the present invention, the band suppressor includes a passband band suppressor and/or a baseband band suppressor.

Further in accordance with a preferred embodiment of the present invention, the first and/or second digital filters include a FIR filter.

In the present invention processing units are added to the conventional receiving scheme. These processing units are designed to decouple the egress and the ingress problems associated with conventional equalization machinery. The egress and the ingress issues are efficiently treated by these additional blocks.

BRIEF DESCRIPTION OF THE DRAWINGS

The present invention will be understood and appreciated from the following detailed description, taken in conjunction with the drawings in which.

DETAILED DESCRIPTION OF A PREFERRED EMBODIMENT

Figure 1A:
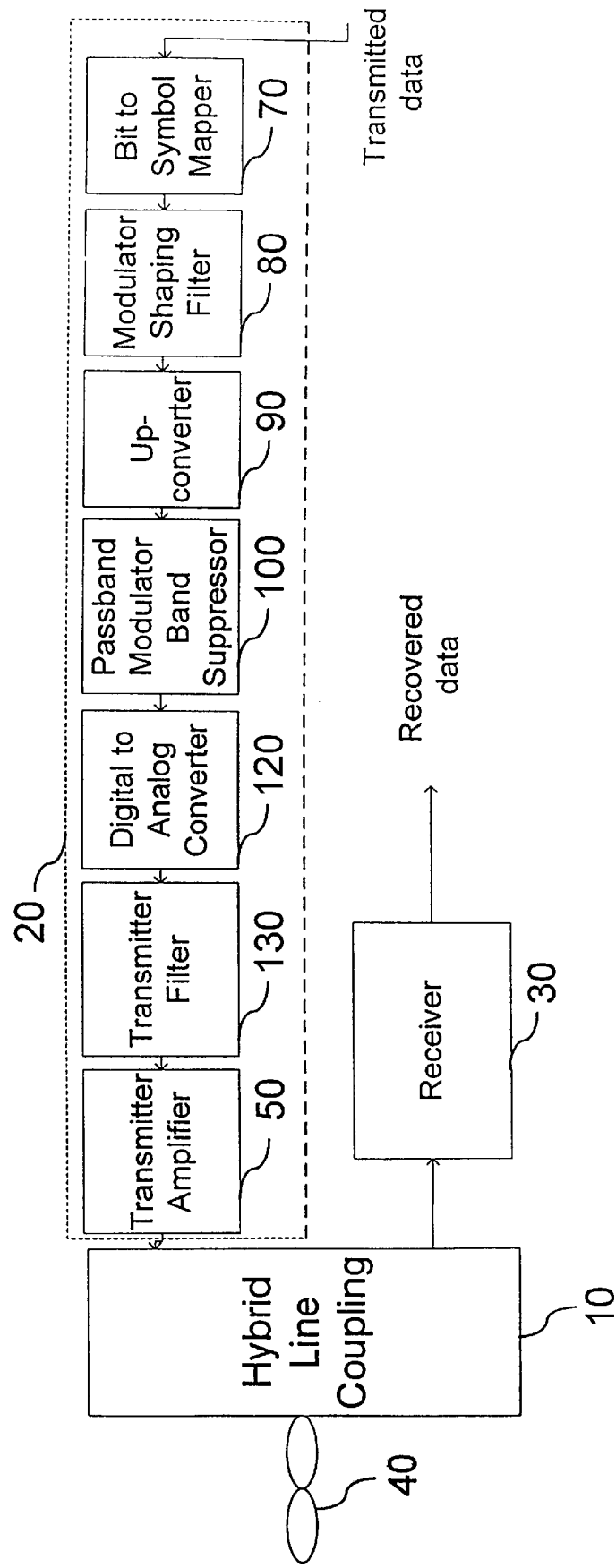
FIG. 1A is a simplified block diagram of a modem device constructed and operative in accordance with a preferred embodiment of the present invention which includes a passband modulator band suppressor.

Reference is now made to FIG. 1A which is a simplified block diagram of a modem device constructed and operative in accordance with a preferred embodiment of the present invention which includes a passband modulator band suppressor.

Figure 4:
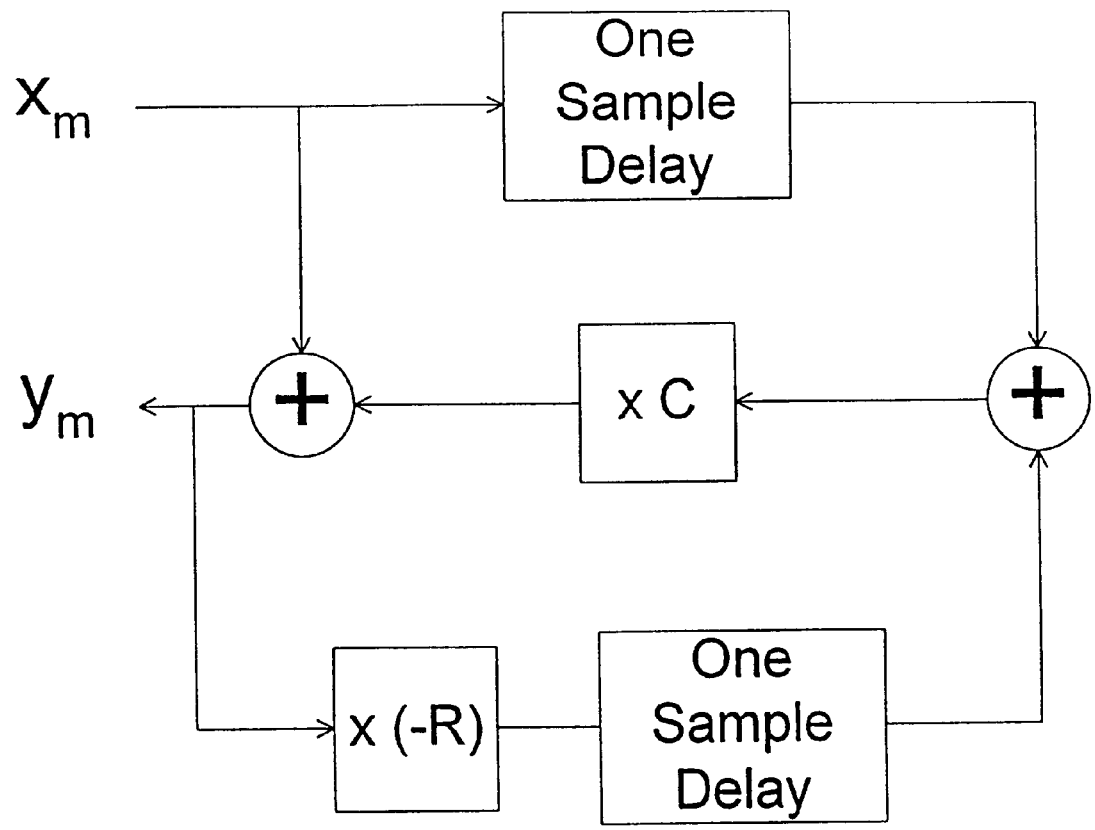
FIG. 4 is a simplified block diagram of a preferred baseband implementation of an individual one of the band suppressor elements of FIG. 2, which implementation is suitable for the baseband modulator of FIG. 1B.
Figure 5A:
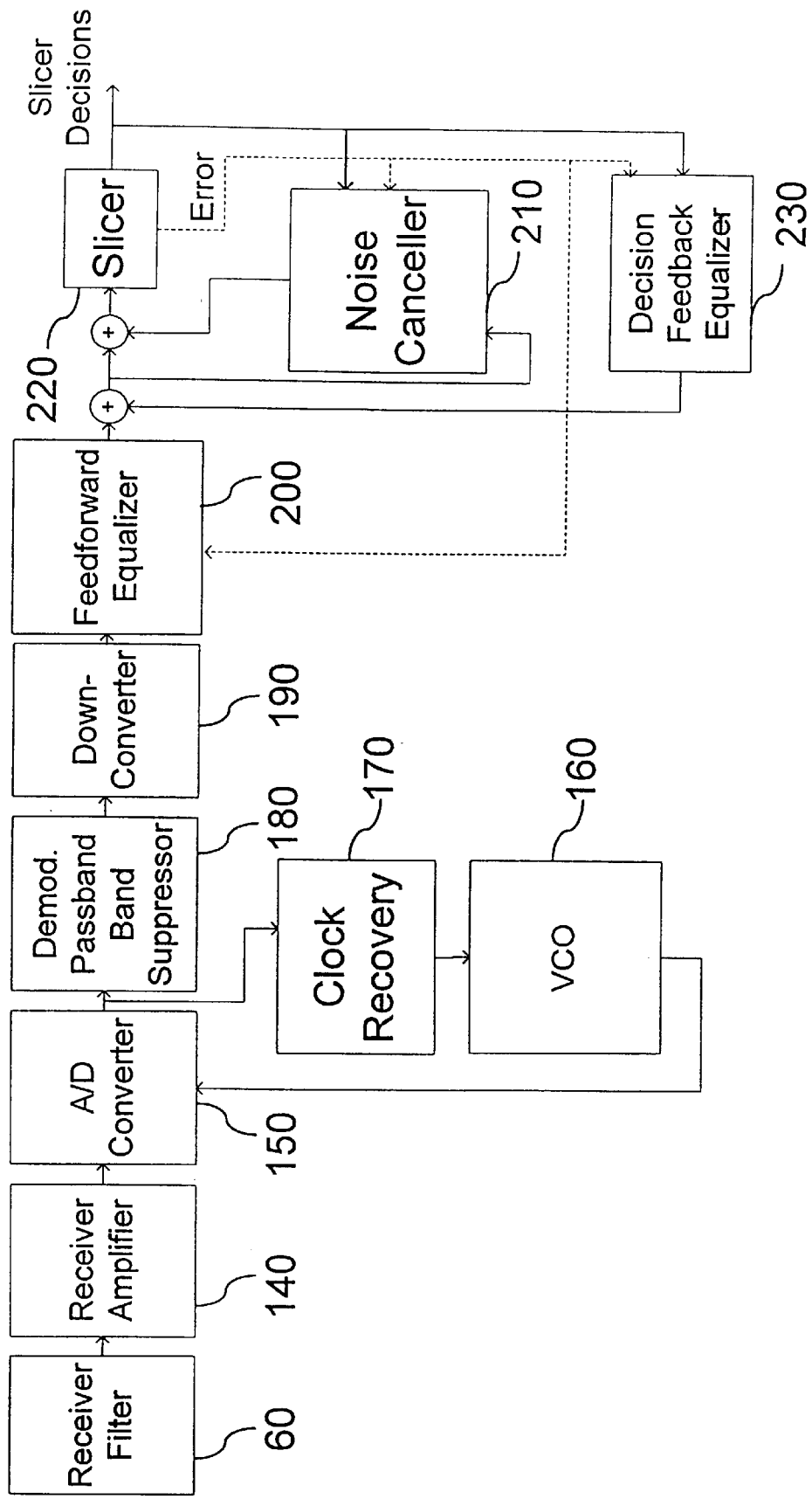
FIG. 5A is a simplified block diagram of a preferred implementation of the receiver of FIGS. 1A–1B, constructed and operative in accordance with a preferred embodiment of the present invention, which includes a passband demodulator band suppressor.

The modem illustrated herein is an example which is suitable for QAM (quadrature amplitude modulation) applications. However it is appreciated that the passband band suppressor of FIGS. 2–4 and the noise canceller of FIGS. 5A–6 are suitable, more generally, for any type of single carrier modulation application and for CAP (carrier-less amplitude phase) modulators.

The apparatus of FIG. 1A includes a hybrid line coupling unit 10 linking a transmitter 20 and a receiver 30 to a 2-wire telephone local loop 40. The hybrid line coupling unit 10 conveys a transmitted signal to local loop 40 and couples a received signal to the receiver 30. Both signals use the same pair of wires for full duplex communications. The hybrid line coupling unit 10 connects the 2-wire telephone local loop 40 to two wire pairs, associated respectively with a transmitter amplifier 50 and a receiver filter 60 (FIGS. 5A–5B), which are used for transmission and reception respectively. A description of how to construct one example of a suitable hybrid line coupling unit 10 is provided in Chen, W. Y. et al, "High bit rate digital subscriber line echo cancellation", IEEE Journal on Selected Areas in Communications, 9(6), August 1991.

The transmitter 20 preferably includes the following elements:

A conventional bit-to-symbol mapper 70 is provided, via which data is routed to a modulator shaping filter 80 which typically comprises two finite impulse response filters (FIRs) including an in-phase filter and a quadrature filter. The filter 80 independently filters two streams of samples, namely the in-phase portion of the incoming data and the quadrature portion of the incoming data, thereby generating two baseband signal streams. The filters may, for example, comprise Nyquist pulses of the type described in Chapter 4 of E. A. Lee and D. G. Messerschmitt, *Digital Communication*, Kluwer Academic Publishers, Boston, 1988.

An up-converter 90 converts the two baseband signal streams into a single passband signal, typically by multiplying the two streams respectively by two sinusoids having a $\pi/2$ phase difference and subtracting one from the other.

Figure 2:
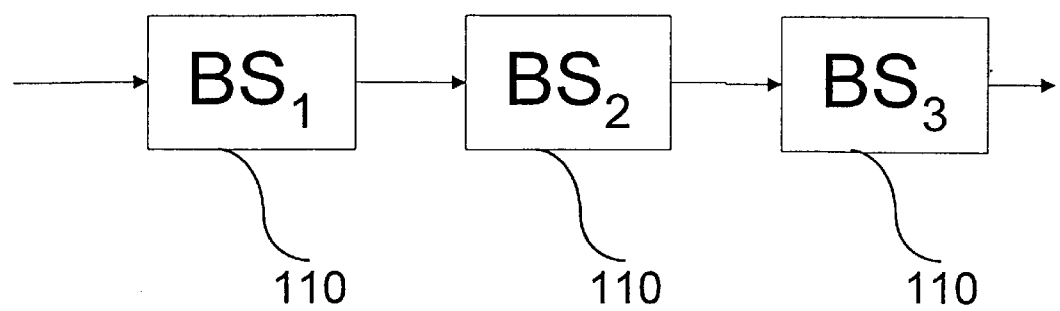
FIG. 2 is a simplified block diagram of a preferred implementation of one of the band suppressor devices of FIG. 1A or 1B.

An optional passband modulator band suppressor 100 receives the output of the up-converter 90. The band suppressor 100 preferably includes a sequence of one or more band suppressor elements 110, such as three band suppressor elements, as shown in FIG. 2. Each band suppressor element is operative to suppress portions of the outgoing signal which fall within a particular frequency band.

Figure 3:
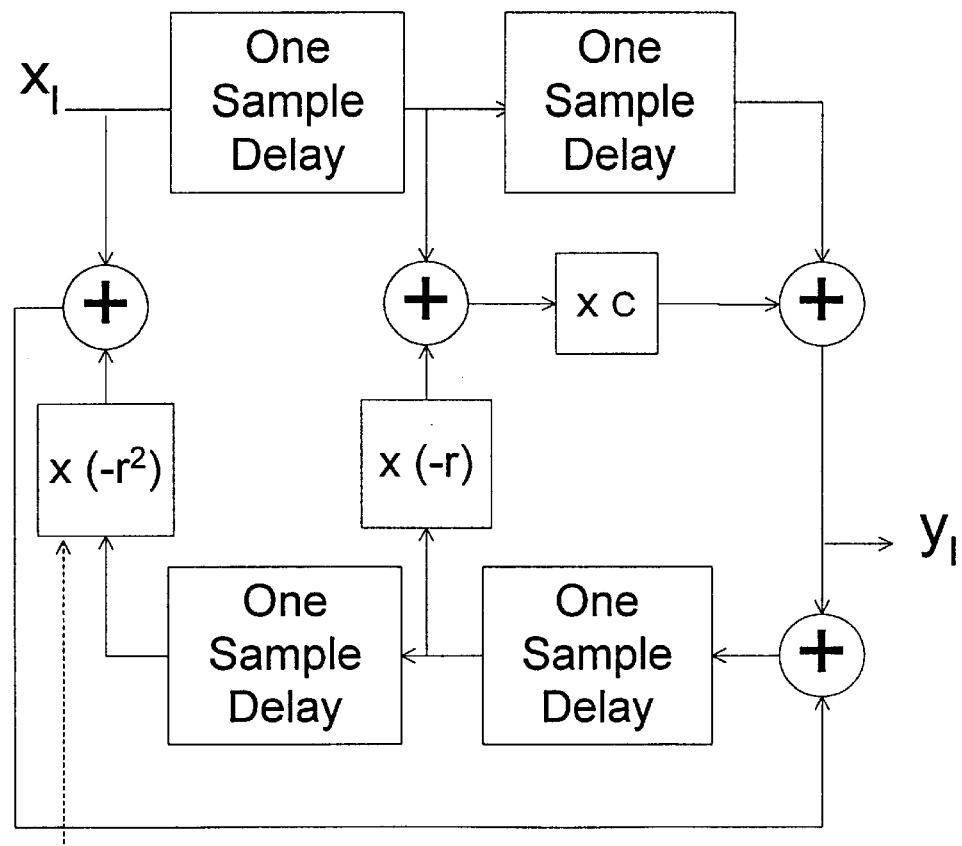
FIG. 3 is a simplified block diagram of a preferred passband implementation of an individual one of the band suppressor elements of FIG. 2, which implementation is suitable for the passband modulator of FIG. 1A.

A preferred embodiment of an individual band suppressor element 110 is described in detail below with reference to FIG. 3. Each band suppressor element 110 creates a notch having a distinct ($f_n$, W) pair. $f_n$, which is a function of c, a multiplication factor in FIG. 3, is the center frequency of the band suppressor element and W, which is a function of r, another multiplication factor in FIG. 3, is bandwidth. A sequence of band suppressor elements 110 such as that shown in FIG. 2 implements a multi-notched mask which provides a low level of transmitted PSD (power spectral density) in certain spectral bands such as amateur radio bands. More generally, a low level of transmitted PSD is preferably provided in spectral bands which are shared by other transceivers which are vulnerable to a DSL transmission.

FIG. 3 is a simplified block diagram of a preferred implementation of an individual one of the band suppressor elements 110 of FIG. 2. Each of the elements of FIG. 3 may have parameters c and/or r which are either programmable or not programmable. In the illustrated embodiment, the r parameter is shown to be programmable and the c parameter is shown to be predetermined however it is appreciated that this is not intended to be limiting.

The difference equation of the filter of FIG. 3 is given by:

$$y(l)=x(l)+cx(l-1)+x(l-2)-rcy(l-1)-r^2y(l-2).$$

where:

$x(l)$=the input to the filter of FIG. 3 at time instant l;

$y(l)$=the output from the filter of FIG. 3 at time instant l;

c is a function of the center frequency $f_n$ of the notched band:

$c=-2\cos(2\pi\, f_n/f_s)$; and $f_s$ is the sample rate.

r is a parameter in the range [0,1] and is typically only slightly less than 1. r determines the bandwidth of the notch filter in that the notch becomes narrow as r approaches 1.

A similar notch filter is described in the above-referenced Stoica and Nehorai publication.

A particular feature of a preferred embodiment of the present invention is that if a first modem transmits to a second modem, the band suppressor 100 in the first modem has an infinite impulse response whose total energy summed over time, after the time span of the decision feedback equalizer 230 (FIGS. 5A–5B) of the second modem, is small relative to the total energy of the infinite impulse response.

Figure 1B:
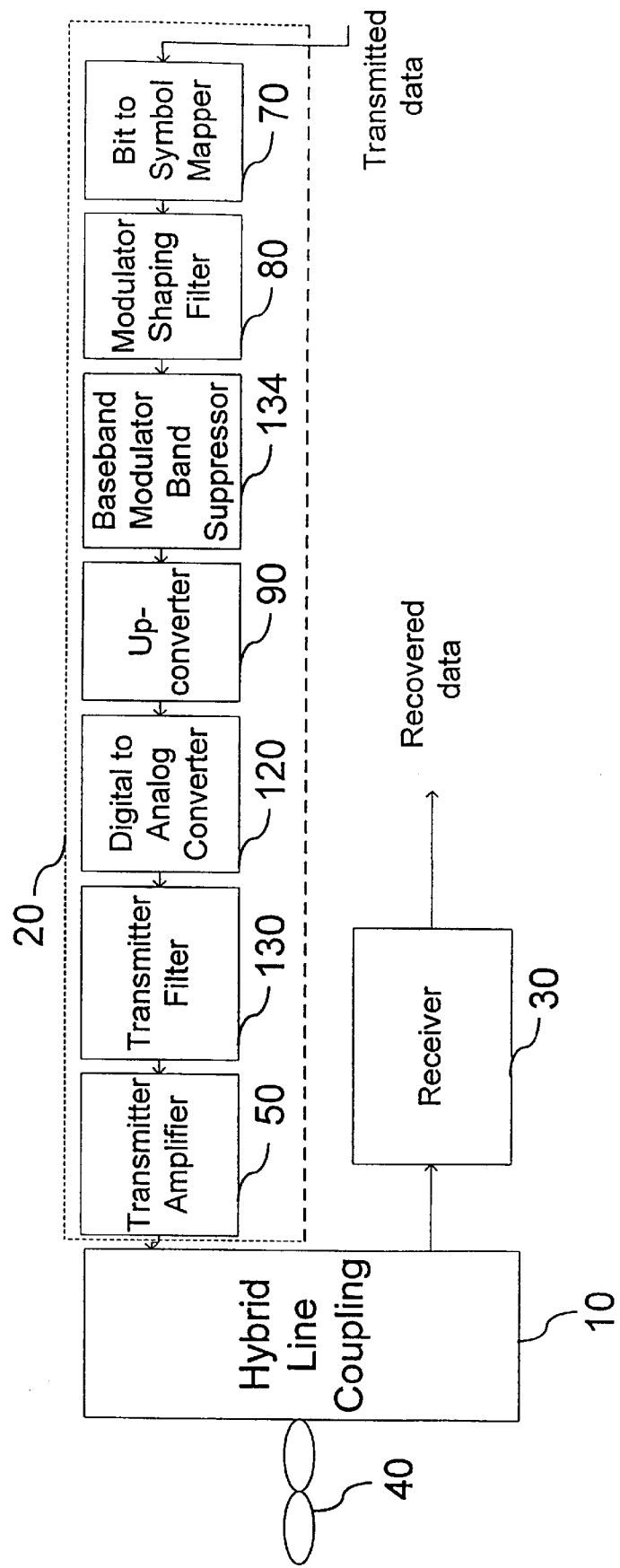
FIG. 1B is a simplified block diagram of a modem device constructed and operative in accordance with a preferred embodiment of the present invention which includes a baseband modulator band suppressor.

Referring again to FIG. 1A, the output of the band suppressor is received by a digital to analog converter 120. In FIG. 1B, in contrast, the D/A converter 120 receives the output of up-converter 90. D/A converter 120 may, for example, comprise an AD9721 D/A converter, commercially available from Analog Devices.

Transmitter filter 130 rejects high frequency images and spurious signals present in the output of D/A converter 120. The configuration of transmitter filter 130 depends on the transmitted frequency band and the out-of-band spectral purity requirements of the particular application.

Transmitter amplifier 50 amplifies the signal to the desired level for transmission.

The hybrid line coupling 10 couples the outgoing signal to the physical medium, i.e. local loop 40.

FIG. 1B is a simplified block diagram of a modem device constructed and operative in accordance with a preferred embodiment of the present invention which includes a baseband modulator band suppressor 134. The baseband modulator band suppressor 134 may, like passband modulator band suppressor 100, include a sequence of one or more suppressor elements 110 as shown in FIG. 2, one of which is illustrated in FIG. 4. Since the baseband modulator band suppressor 134 precedes the up-converter 90, it processes complex valued samples.

The difference equation of the filter of FIG. 4 is:

$$y(m)=x(m)+Cx(m-1)-R\,C\,y(m-1).$$

where:

x(m)=the input to the filter of FIG. 4 at time instant m;

y(m)=the output from the filter of FIG. 4 at time instant m;

C is a function of the center frequency $f_n$ of the notched band:

$C=-\exp(2\pi\, f_n/f_s)$;

$f_s$ is the processing rate;

and wherein x(m), y(m) and C are all complex valued quantities.

R is a parameter in the range (0,1) and is typically only slightly less than 1. R determines the bandwidth of the notch filter in that the notch becomes narrow as R approaches 1.

Two embodiments of the receiver 30 of FIGS. 1A–1B are now described in detail with reference to FIGS. 5A–5B:

The hybrid line coupling 10 of FIGS. 1A–1B is operative to receive a far end signal via two-wire cable 40 and to transfer the received signal to the receiver filter 60 of the receiver 30.

In the analog domain, the received signal is processed by receiver filter 60 and receiver amplifier 140 which typically comprises an automatic gain control amplifier. The receiver filter 60 rejects the received power at frequencies falling outside of the system's transmission band. The resulting signal passes to amplifier 140 whose gain is typically adapted in accordance with the level of the received signal. The amplifier 140 includes a control loop which maintains a constant power signal at the input to an A/D converter 150. This control is enabled only at the start-up stage. At the end of this stage, the automatic gain control is preferably terminated since continual operation of the circuit may prevent proper cancellation of varying power interferences. Typically, the communication characteristics of channel 40 vary slowly over time and compensation for this effect is preferably provided by a decision feedback equalizer unit 230, described in detail below.

The analog output signal of analog amplifier 140 is converted to quantized samples by the A/D converter 150. The A/D converter 150 may, for example, comprise an AD9040A D/A converter, commercially available from Analog Devices. The level of the input signal to the D/A converter, when free of narrowband interferences, is typically set to occupy less than the full precision scale of the A/D so as to leave a few MSBs (most significant bits), such as 1–3 bits, for the digital representation of high level interfering signals.

The sampling epochs of the A/D are determined by a VCO (voltage controlled oscillator) 160. A clock recovery circuit 170 controls the oscillator 160 and thereby recovers a clock at an integer multiple of the transmitted symbol rate. The VCO 160 in conjunction with the clock recovery circuit 170 generate a predetermined number of clock pulses, such as 2–4 clock pulses, every symbol period. The integer multiple of the transmitted symbol rate is typically equal to the processing rate of the demodulator, expressed in samples/symbol.

Several techniques for timing recovery are described in Chapter 15 of the above-referenced Lee and Messerschmitt publication and in Chapter 6 of R. D. Gitlin et al, *Data Communications Principles,* Plenum Press, New York, 1992.

The embodiment of FIG. 5A includes a passband demodulator band suppressor 180 whereas the embodiment of FIG. 5B includes a baseband demodulator band suppressor 234 as described in detail below. The receiver band suppressor 180 may be similar to the band suppressor of FIGS. 2–3 except that it may reject different frequency ranges. The receiver band suppressor 180 provides a predetermined rejection of notched bands which are selected based on the application. The output signal of the band suppressor 180 is routed to a down converter 190 which converts the passband real-valued samples to baseband complex valued samples. This is performed by multiplying the real valued samples by $\exp\{-j\,2\pi\,f_c\,n/f_s\}$, where:

$j=(1)^{1/2}$;

$f_c$=the center frequency of the passband signal;

$f_s$=the processing rate; and n=the serial number of a current sample.

As illustrated in FIG. 5A, the subunits which follow the A/D converter 150 form an adaptive scheme. This scheme includes a FFE (feedforward equalizer) 200, a DFE (Decision feedback equalizer) 230 and a narrow band noise canceller 210.

The output of the down converter 190 is fed into the FFE 200. The decisions of a slicer 220 are routed to the noise canceller 210 and to the DFE 230. The sum of the output samples of the FFE 200 and the DFE 230 is fed into the noise canceller 210. The error signal generated by the slicer 220 is used to adapt all the three filters. Additionally the error signal is processed by the noise canceller 210 to generate the output samples.

The FFE 200 partially compensates for phase and amplitude distortion of the channel 40. The FFE 200 preferably operates as a fractionally spaced equalizer in that it processes the data at a higher rate than the symbol rate. An advantage of fractionally spaced equalization operation is that aliasing of the received signal is avoided.

The DFE 230 typically comprises a conventional adaptive filter that unravels ISI (inter-symbol interference) caused by the channel with a reduced noise enhancement relative to the FFE 200. Both filters 200 and 230 are adapted using an error signal generated by a slicer 220. The error signal indicates the difference between the signal entering the slicer and the output signal of the system, which the slicer 220 generates and feeds back to the DFE 230 as well as out of the system.

Additional design considerations for filters 200 and 230 are described in Chapter 9 of the above-referenced Lee and Messerschmitt publication, in Chapter 8 of the above-referenced Gitlin publication and in S. U. Qureshi, "Adaptive equalization", Proceedings of the IEEE, Vol. 73(9), September 1985, pp. 1349–1387.

Figure 5B:
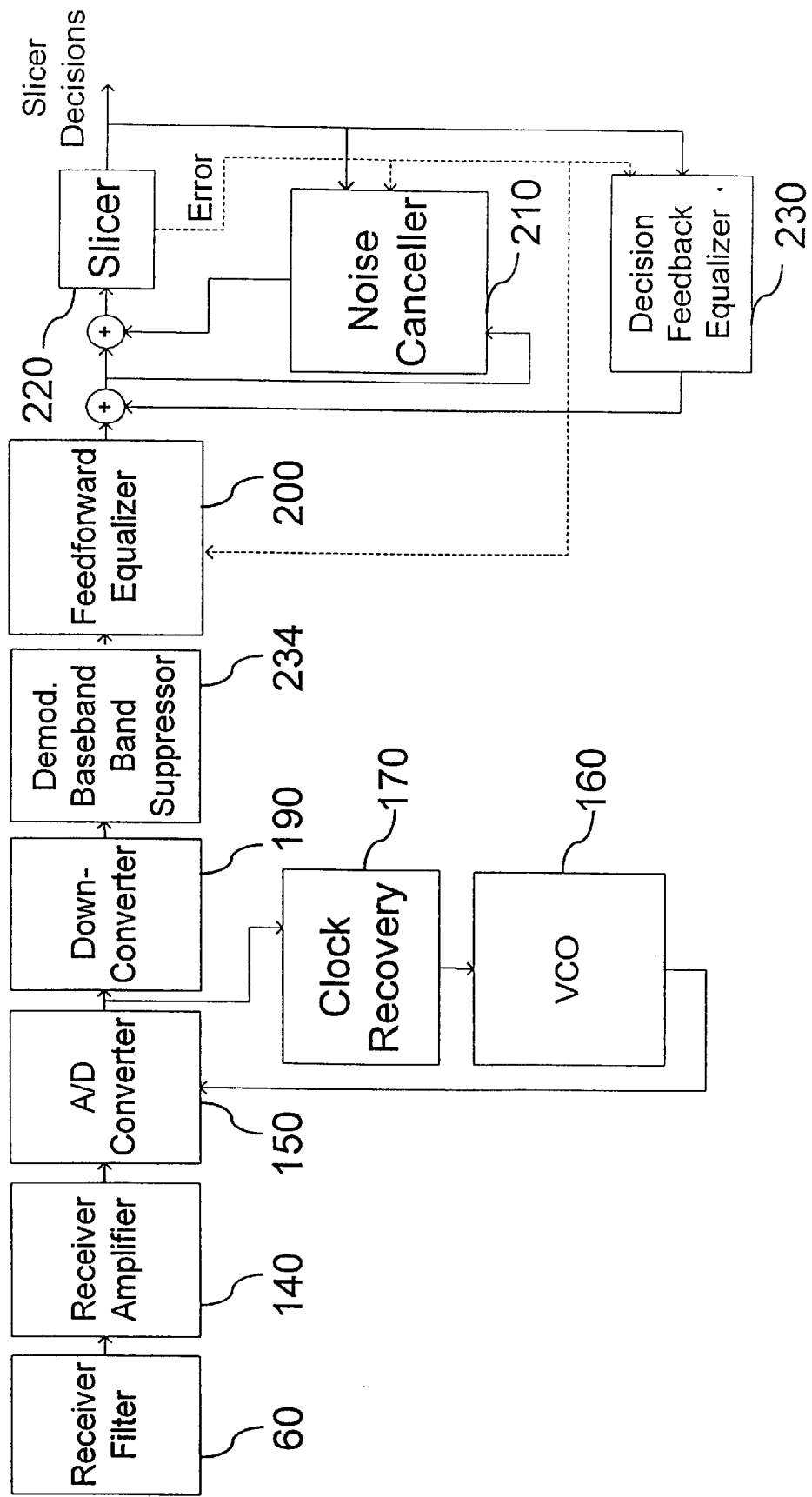
FIG. 5B is a simplified block diagram of a preferred implementation of the receiver of FIGS. 1A–1B, constructed and operative in accordance with a preferred embodiment of the present invention, which includes a baseband demodulator band suppressor.
Figure 6:
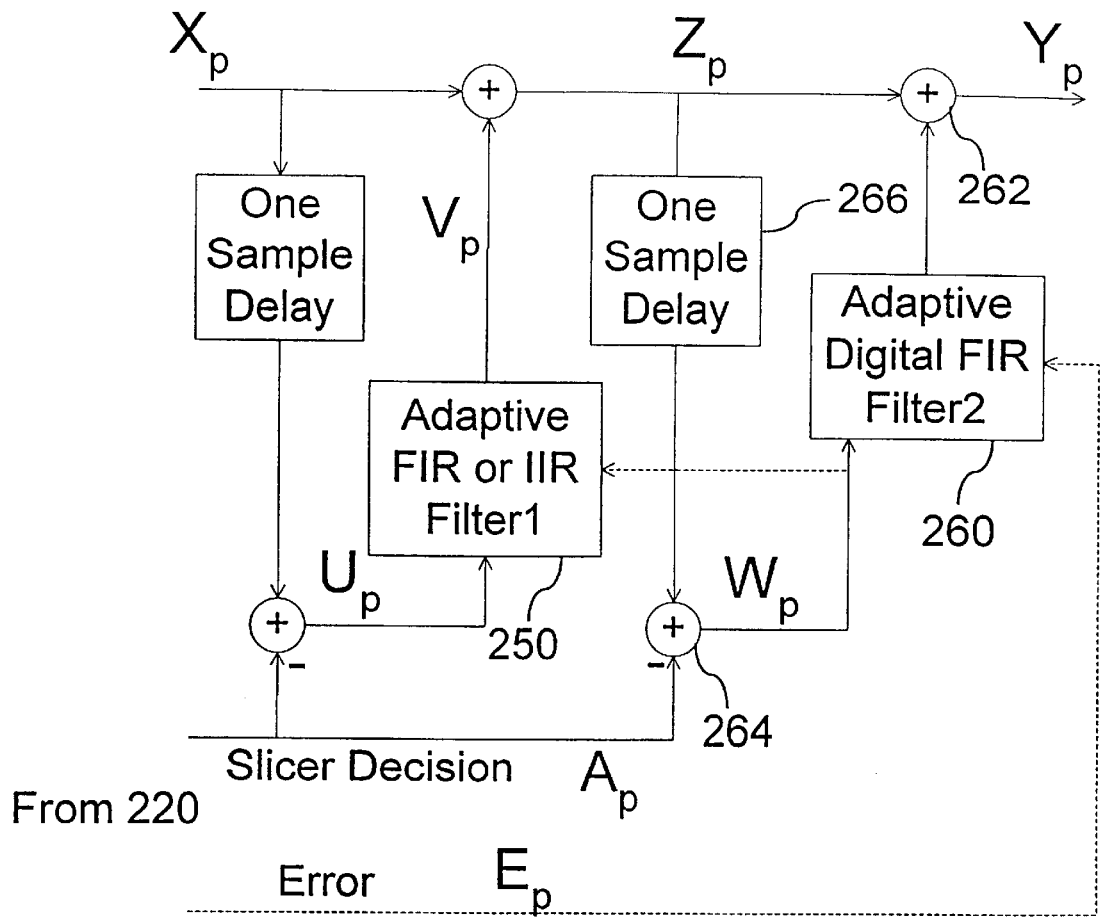
FIG. 6 is a simplified block diagram of a preferred implementation of the noise canceller of FIGS. 5A–5B.

Reference is now made to FIG. 5B which is a simplified block diagram of a preferred implementation of the receiver of FIGS. 1A–1B, constructed and operative in accordance with a preferred embodiment of the present invention, which includes a baseband demodulator band suppressor. The apparatus of FIG. 5B is generally similar to the apparatus of FIG. 5A except for the following differences:

The passband band suppressor 180, preceding down-converter 190 in FIG. 5A, is replaced by a baseband band suppressor 234 which follows down-converter 190. As described above, the passband band suppressor 180, as illustrated in FIG. 2, may include one or more of the passband band suppressor elements of FIG. 3. In contrast, the baseband band suppressor 234, as illustrated in FIG. 2, may include one or more of the baseband band suppressor elements of FIG. 4.

FIG. 6 is a simplified block diagram of a preferred implementation of the noise canceller 210 of FIGS. 5A–5B. Preferably, the noise canceller 210 includes a pair of adaptive filters 250 and 260, arranged as shown, which together provide strong and rapid rejection of narrow band interferences.

The apparatus of FIGS. 5A–6 decouples ISI mitigation from RFI (radio frequency interference) cancellation by achieving the two effects with two separate mechanisms. The filters 200 and 230 of FIGS. 5A–5B mitigate ISI and the adaptive filters 250 and 260 of FIG. 6 cancel radio frequency interfering signals. The narrow band noise canceller of FIG. 6 receives the slicer decisions and a sum $X_p$ of the outputs of FFE 200 and DFE 230. A non-zero difference between these two samples is indicative of the existence of a narrow band interference signal. This difference is fed to the first adaptive filter 250.

If narrow band interference occurs during the start-up period of the apparatus shown and described herein, the apparatus is typically restarted. Once the start-up period has passed and the DFE and FFE have already converged, then narrow band interference of intermittent transmission, if present, is nulled by the narrow band noise canceller of FIG. 6, and the DFE and FFE, consequently, need not adapt to a different solution. The adaptive filter 250 of narrow band noise canceller of FIG. 6 generates estimates of the instantaneous level and frequency of RFI at the point of input to the apparatus of FIG. 6. Therefore, the RFI interference can be cancelled out.

The separate treatment of RFI and ISI by the noise canceller of FIG. 6, and elements 200 and 230, respectively, ensures both rapid tracking of the frequency-agile interfering signals and strong rejection.

Further acceleration of the cancellation process is achieved by providing two filters in the structure of FIG. 6. The first filter 250 comprises an FIR filter or an IIR (infinite impulse response) filter which has very low noise enhancement. The second filter 260 typically comprises a FIR structure which has a higher level of noise enhancement and a very short convergence time.

When a transmission of a narrow band interfering signal occurs, the second filter 260 provides the initial cancellation of the signal, due to its very short convergence time. Subsequently, the first filter develops a notch at the interference frequency and the notch of the second filter vanishes. Therefore, the steady state performance in the presence of narrow band interfering signals degrades only slightly relative to performance in a normal situation in which narrow band interference is absent.

The narrow band noise canceller of FIG. 6 processes substantially only the noise portion of the incoming signal received by the system from two-wire channel 40 and therefore, unlike conventional standard notch filters, does not generate additional ISI.

Preferably, since ISI is dealt with by filters 200 and 230 of FIGS. 5A–5B, the narrow band noise canceller of FIG. 6 is configured to deal with only RFI, but without increasing the amount of ISI.

Preferred relationships between the input and output quantities of FIG. 6 are now described, using the following notation:

$X_p$=input sample of the narrow band noise canceller of FIG. 6 at time instant p;

$Y_p$=output sample of the narrow band noise canceller of FIG. 6 at time instant p;

$A_p$="slicer decision" output of slicer 220 at time instant p, normalized to the level of the corresponding input signal to the slicer.

$E_p$=the corresponding error sample generated by the slicer at the same time instant p, defined as:

$$E_p = Y_p - A_p$$

$F_1, F_2, \ldots, F_k$=adaptive complex valued coefficients of the first adaptive filter 250 which is a constrained IIR structure, typical constraints being defined below S=real valued parameter of the first filter 250, in the [0,1] range, typically a value close to 1 such as 0.875.

$G_1, G_2, \ldots, G_q$=adaptive coefficients of the second adaptive filter 260 which typically comprises an adaptive FIR filter.

$U_p$=the input to the first filter at time instant p, namely:

$$U_p = X_p - A_p$$

$V_p$=the output from the first filter at time instant p, namely:

$$V_p = \Sigma[-S^i(U_{p-i} + V_{p-i}) + U_{p-i}]F_i \quad i=1,2,\ldots,k$$

$Z_p$=an intermediate sample, as shown in FIG. 6, namely $V_p + X_p$ $W_p$=the input signal to the second filter 260, namely $Z_p - A_p$ The output of the apparatus of FIG. 6, $Y_p$, as shown in FIG. 6, is:

$$y_p = X_p + V_p + \Sigma G_i W_{p-i} \quad i=1,2,\ldots q$$

The second filter 260 is adapted according to a suitable criterion such as the LMS (least mean squares) criterion, using the error samples generated by the slicer. Conventional LMS based adaptation processes are described in Chapter 9 of the above-referenced Lee and Messerschmitt publication, in Chapter 8 of the above-referenced Gitlin publication and in the above referenced Qureshi article.

Adaptation of the first filter may be a conventional adaptation process applicable to IIR filters as described in Regalia, P. A., *Adaptive IIR filtering in signal processing and control*, Marcel Dekker, New York, 1995.

Alternatively, a simpler adaptation rule, conventionally used for FIR filters, may be employed, namely:

$$F_d \leftarrow F_d - \mu W_g (U_{g-d})^*,$$

where:

$\mu$=adaptation constant of the first filter $F_d$=the d-th coefficient of the first filter (d=1, 2, ..., k)

*=conjugate operator g=time instant

It is appreciated that optionally, the second filter 260 may be omitted along with the summer 262, the summer 264 and the delay 266. In this embodiment, the first filter is typically an IIR filter.

Referring back to FIGS. 5A–5B, the slicer 220 is now described. The slicer generates estimates, also termed herein "slicer decisions", of the sequence of symbols generated by bit to symbol mapper 70 from the transmitted data arriving from a remote transmitter. The estimate at any decision instant typically is taken to be the nearest symbol to the slicer input. The slicer also generates error samples, $E_p$, which are the differences between the input samples and the decisions made therefrom.

A suitable slicer is described in Chapter 4 of the above-referenced Lee and Messerschmitt publication.

Figure 7:
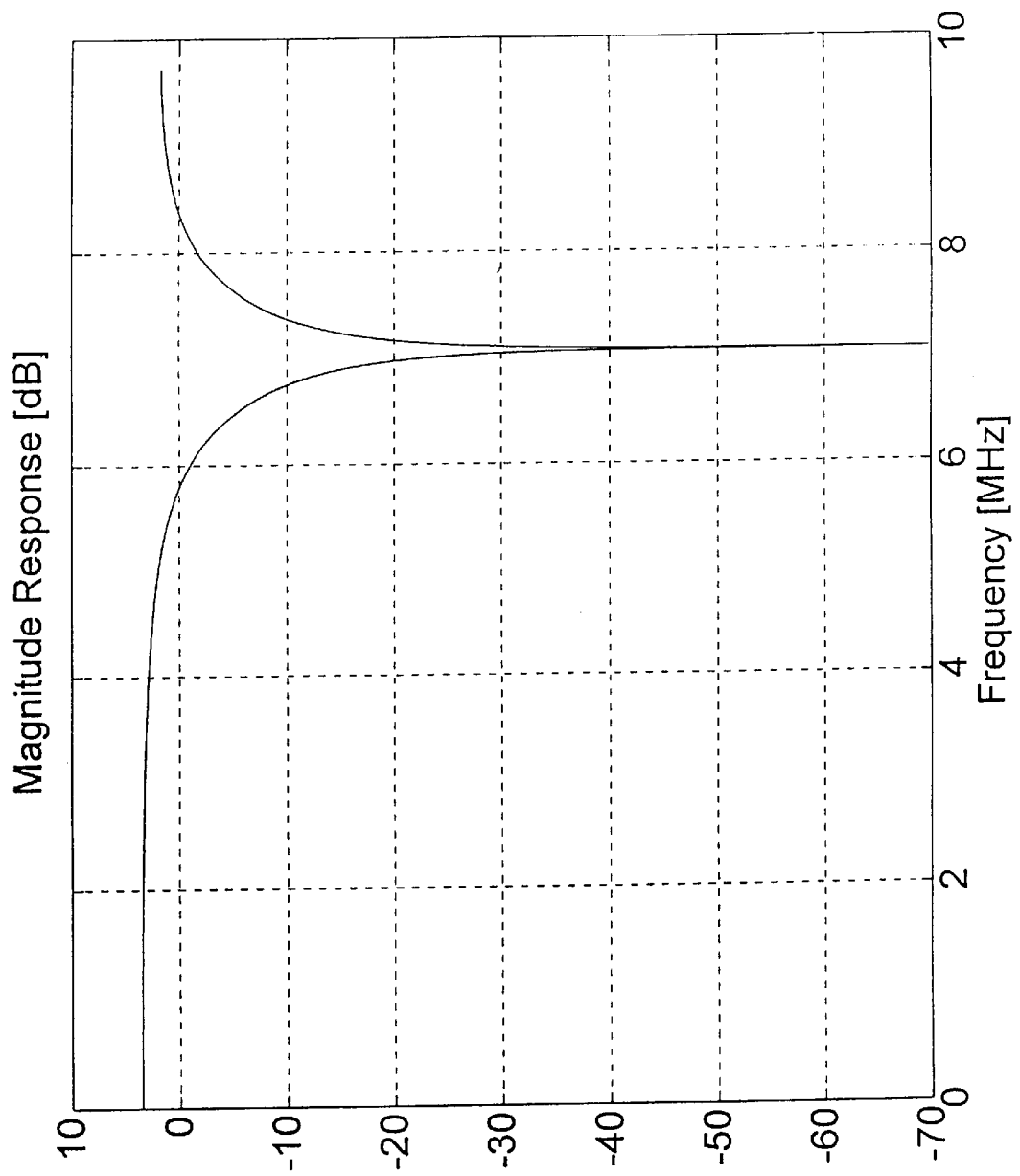
FIG. 7 is a graph of an example of a frequency response of the passband band suppressor of FIG. 1A or 5A.
Figure 8:
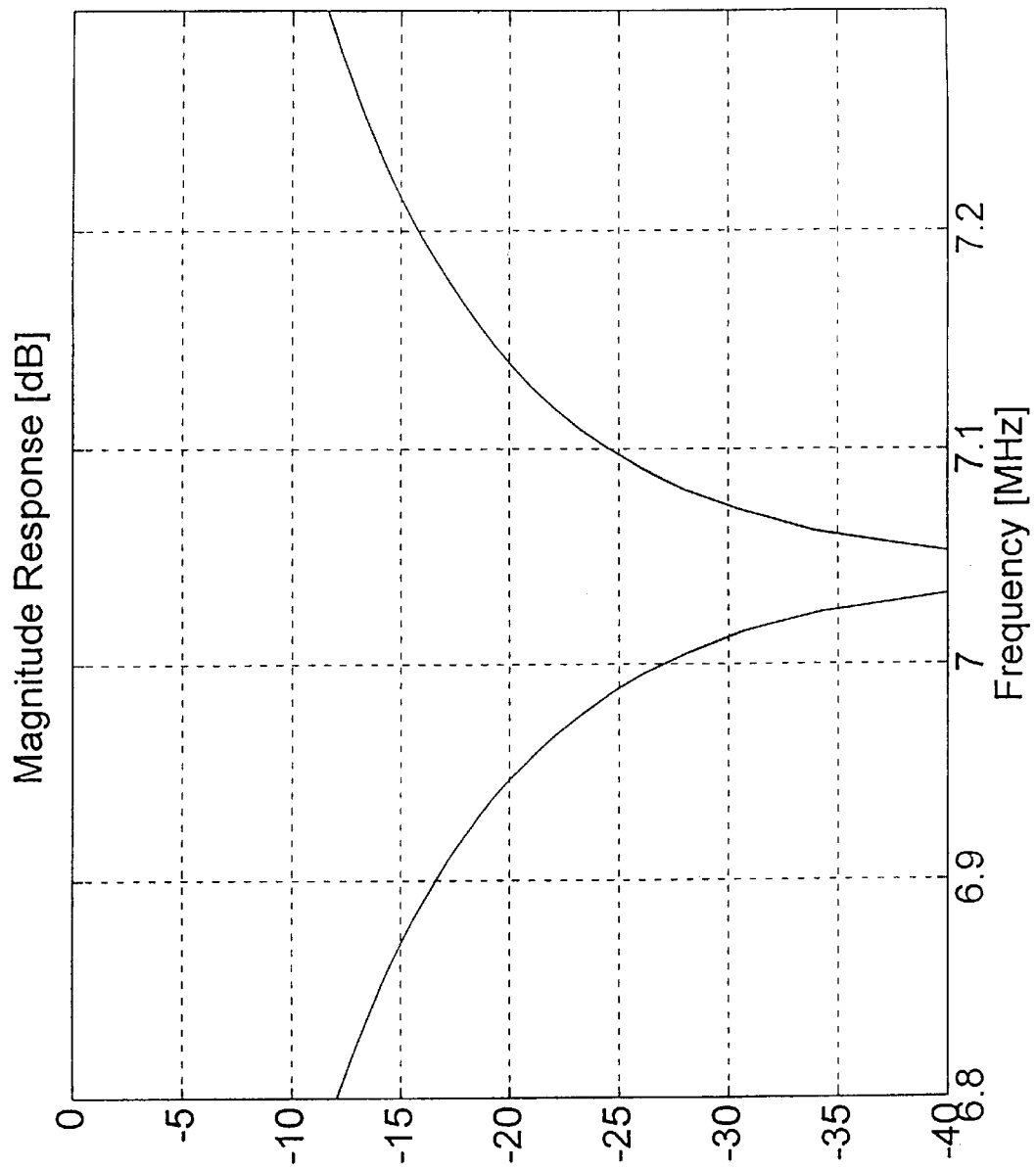
FIG. 8 is an enlarged portion of the graph of FIG. 7.

FIG. 7 is a graph of an example of a frequency response of the passband modulator band suppressor of FIG. 1A for a notch whose center frequency is 7.05 MHz. In the example of FIG. 7, the processing rate is 19.44 MHz, the symbol rate is 6.48 MBaud. As best seen in FIG. 8, this filter provides more than 20 dB of rejection of the amateur frequency band 7–7.1 MHz if, for +example, r=¾ and c=⁸³⁄₆₄.

Figure 9:
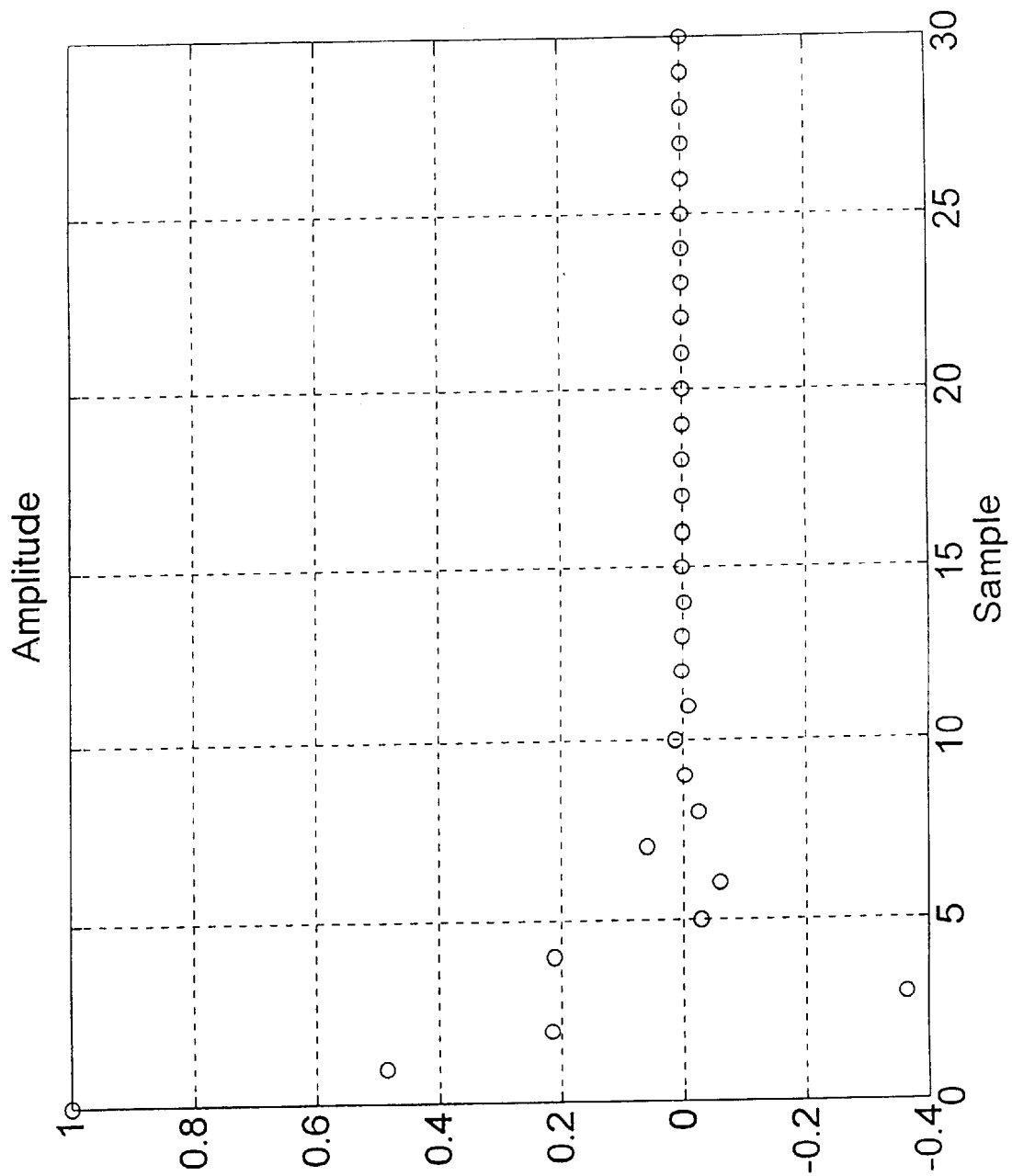
FIG. 9 is a graph of the impulse response of a passband band suppressor having the frequency response illustrated in FIGS. 7–8.

FIG. 9 is a graph of the impulse response of a passband modulator band suppressor having the frequency response illustrated in FIGS. 7–8. FIG. 9 shows that after 15 samples (equivalent to 5 symbol periods), the absolute value of the impulse response is very small, typically smaller than 0.01. After 23 samples (equivalent to about 8 symbol periods), the absolute value of the impulse response is smaller than 0.001.

It is appreciated that, according to alternative embodiments of the present invention, a modem may include one, some or all of the following elements: the passband modulator band suppressor 100 of FIG. 1A, the baseband modulator band suppressor 134 of FIG. 2, the passband demodulator band suppressor 180 of FIG. 5A, the baseband demodulator band suppressor 234 of FIG. 5B and the noise canceller of FIG. 6. A modem including any subset of the above elements is within the scope of the present invention.

The present invention is disclosed using a QAM modulation. However, the modules in the present invention which are to suppress narrow band interferers and those units which are used to reduce the transmit PSD in given frequency bands are utilized in conjunction with any single carrier modulation technique. This method includes other two-dimensional schemes and also higher dimensional schemes. The band suppressors and the narrow band noise canceller may also be implemented in baseband modulation and carrierless modulation schemes.

The present invention is disclosed in the context of the VDSL transmission technique which operates at downstream bit rates of at least 6 Mb/s. Additionally the present invention may also be used at lower bit rates.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A high-speed data receiver, comprising:
   input circuitry, which is operative to receive and pre-process an input signal from a noisy communications channel;
   a demodulator, adapted to receive the pre-processed input signal and to generate, responsive thereto, a stream of output data; and
   a noise canceller, coupled to receive the pre-processed input signal and the stream of output data, and to provide a noise cancellation signal to the demodulator responsive to noise in the channel in a narrow frequency range, the noise canceller comprising:
      a first adaptive filter, adapted to generate a first component of the noise cancellation signal that converges to provide high rejection of the noise within the narrow frequency range;
      a second adaptive filter, adapted to generate a second component of the noise cancellation signal that provides, relative to the first adaptive filter, lower rejection of the noise in the narrow frequency range with more rapid convergence; and
      at least one summer, coupled to add both the first and second components of the noise cancellation signal together for combination with the pre-processed input signal received by the demodulator.

2. A receiver according to claim 1, wherein the noise canceled by the noise canceller comprises narrowband radio frequency interference.

3. A receiver according to claim 1, wherein at least one of the first and second adaptive filters comprises an infinite impulse response (IIR) filter.

4. A receiver according to claim 1, wherein the second adaptive filter is coupled to receive an input indicative of convergence of the first adaptive filter, whereby a magnitude of the second component of the noise cancellation signal is reduced responsive to the convergence of the first adaptive filter.

5. A receiver according to claim 1, wherein the noise canceller is configured to provide the noise cancellation signal substantially without reliance on any reference signal apart from the input signal pre-processed by the input circuitry for input to the demodulator.

6. A high-speed data receiver, comprising:
   input circuitry, which is operative to receive and pre-process an input signal from a noisy communications channel;
   a demodulator, adapted to receive the pre-processed input signal and to generate, responsive thereto, a stream of output data; and
   an adaptive noise canceller, coupled to receive the pre-processed input signal and the stream of output data, and to provide a noise cancellation signal to the demodulator responsive to noise in the channel in a narrow frequency range, the noise canceller comprising an infinite impulse response (IIR) filter, which converges to provide rejection of the noise in the narrow frequency range.

7. A receiver according to claim 6, wherein the noise canceled by the noise canceller comprises narrowband radio frequency interference.

8. A receiver according to claim 6, wherein the noise canceller is configured to provide the noise cancellation signal substantially without reliance on any reference signal apart from the input signal pre-processed by the input circuitry for input to the demodulator.

9. A high-speed data receiver, comprising:
   input circuitry, which is operative to receive and pre-process an input signal from a noisy communications channel;
   a demodulator, adapted to receive the pre-processed input signal and to generate, responsive thereto, a stream of output data; and
   a noise canceller, coupled to receive the pre-processed input signal and the stream of output data, but not to receive any reference signal indicative of the noise in the channel, and to provide a noise cancellation signal to the demodulator responsive to narrowband noise in the channel, the noise canceller comprising first and second adaptive filters, adapted to generate respective first and second components of the noise cancellation signal.

10. A receiver according to claim 9, wherein the narrowband noise canceled by the noise canceller comprises narrowband radio frequency interference.

11. A receiver according to claim 9, wherein at least one of the first and second adaptive filters comprises an infinite impulse response (IIR) filter.

12. A receiver according to claim 9, wherein the second adaptive filter is coupled to receive a signal indicative of convergence of the first adaptive filter, and to generate the second component responsive to convergence-indicating signal.

13. A method for processing an input signal received over a noisy communications channel, comprising:

detecting narrowband noise in the channel;

adaptively generating a first noise cancellation signal, responsive to the detected narrowband noise, which converges so as to provide high rejection of the noise within a narrow frequency range of the noise;

adaptively generating a second noise cancellation signal, responsive to the detected narrowband noise, so as to provide, relative to the first noise cancellation signal, lower rejection of the noise in the narrow frequency range, with more rapid convergence;

adding the first and second noise cancellation signals together for combination with the input signal, so as to cancel the noise from the signal; and demodulating the input signal so as to generate a stream of output data.

14. A method according to claim 13, wherein detecting the narrowband noise comprises detecting narrowband radio frequency interference.

15. A method according to claim 13, wherein adaptively generating the first and second noise cancellation signals comprises generating the noise cancellation signals substantially without reliance on any reference signal apart from the input signal.

16. A method according to claim 13, wherein adaptively generating the first noise cancellation signal comprises applying an infinite impulse response (IIR) filter to generate the first noise cancellation signal.

17. A method according to claim 13, wherein adaptively generating a second noise cancellation signal comprises receiving an input indicative of convergence of the first noise cancellation signal, and reducing a magnitude of the second noise cancellation signal responsive to the convergence.

18. A method for processing an input signal received over a noisy communications channel, comprising:

detecting narrowband noise in the channel;

adaptively generating a noise cancellation signal using an infinite impulse response (IIR) filter, which converges responsive to the detected narrowband noise so as to provide high rejection of the noise within a narrow frequency range of the noise; and demodulating the input signal, responsive to the noise cancellation signal, so as to generate a stream of output data.

19. A method according to claim 18, wherein detecting the narrowband noise comprises detecting narrowband radio frequency interference.

20. A method according to claim 18, wherein adaptively generating the noise cancellation signal comprises generating the noise cancellation signal substantially without reliance on any reference signal apart from the input signal.

21. A method for processing an input signal received over a noisy communications channel, comprising:

detecting narrowband noise in the channel centered on a given noise frequency;

adaptively generating a first noise cancellation signal, responsive to the detected narrowband noise, substantially without reliance on any reference signal apart from the input signal;

adaptively generating a second noise cancellation signal, responsive to the detected narrowband noise and to the first noise cancellation signal, substantially without reliance on any reference signal apart from the input signal; and demodulating the input signal, responsive to the first and second noise cancellation signals, so as to generate a stream of output data.

22. A method according to claim 21, wherein detecting the narrowband noise comprises detecting narrowband radio frequency interference.

23. A method according to claim 21, wherein adaptively generating the first and second noise cancellation signals comprises applying an infinite impulse response (IIR) filter to generate at least one of the noise cancellation signals.

\* \* \* \* \*